L. COATES & J. T. CRISWELL.

BUTTER PRINT PRESS.

No. 10,130. Reissued June 6, 1882.

WITNESSES:

Gustave Dieterich

C. Sedgwick

INVENTOR

L. Coates

J. T. Criswell

BY Munn & Co.

ATTORNEY

N. PETERS. Photo-Lithographer, Washington, D. C.

UNITED STATES PATENT OFFICE.

LEWIS COATES AND JOEL T. CRISWELL, OF COLLAMER, PENNSYLVANIA.

BUTTER-PRINT PRESS.

SPECIFICATION forming part of Reissued Letters Patent No. 10,130, dated June 6, 1882.

Original No. 142,838, dated September 16, 1873. Application filed March 25, 1882.

*To all whom it may concern:*

Be it known that we, LEWIS COATES and JOEL T. CRISWELL, both of Collamer, in the county of Chester and State of Pennsylvania, have invented a new and useful Improvement in Butter-Print Presses, of which the following is a full, clear, and exact description.

The object of our invention is to furnish to farmers and dairymen an improved butter print or press, by which the butter may be quickly and evenly formed into cakes of required weight, with suitable print-marks thereon, without previous weighing.

Our invention consists in the sliding box in which the butter is placed and pressed on a printing-block by a follower-block and lever into suitable shape and weight.

Reference is to be had to the accompanying drawings, forming part of this specification, in which similar letters of reference indicate corresponding parts in all the figures.

Figure 1:
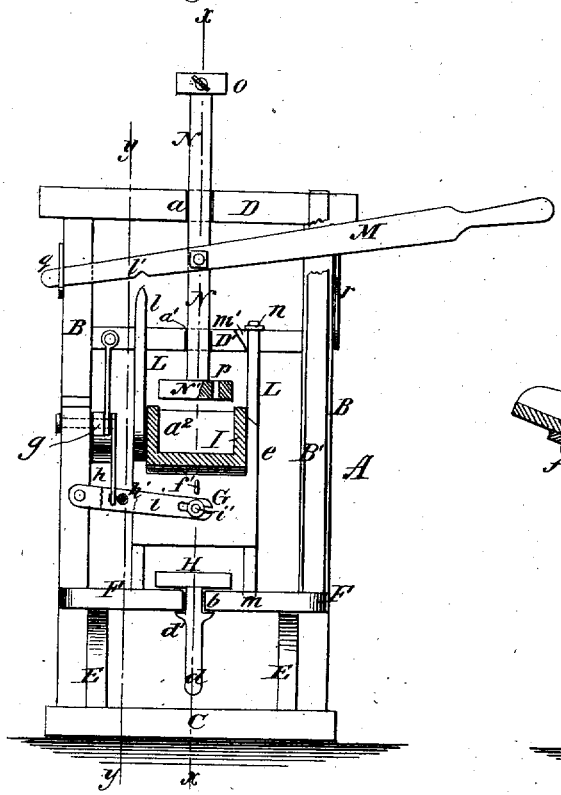
Figure 2:
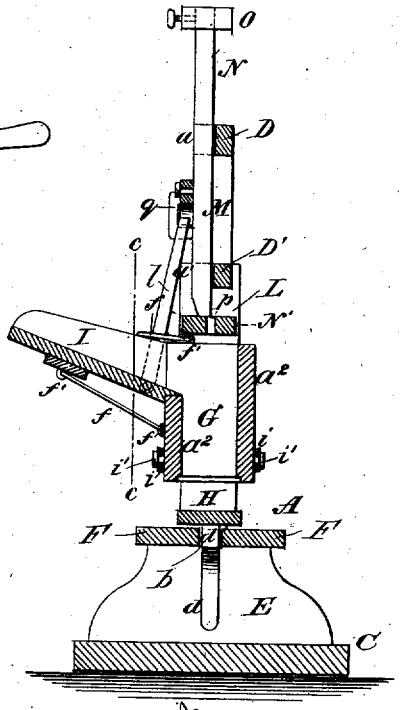
Figure 4:
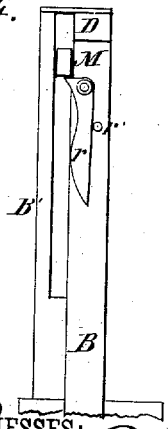
Figure 5:
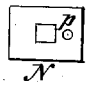
Figure 3:
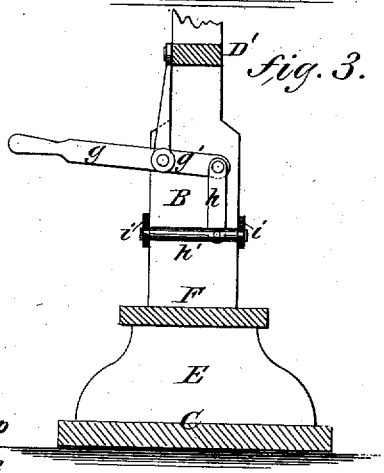
Figure 6:
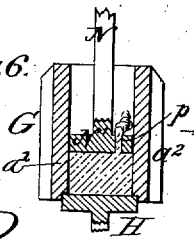

Figure 1 is a front elevation of our improved butter-press, partly in section on the line *c c* of Fig. 2. Fig. 2 is a vertical transverse section of the press on line *x x* of Fig. 1. Fig. 3 is a detail transverse section on line *y y* of Fig. 1 to show lever arrangements of sliding box. Fig. 4 is a detail side view of the main frame to show stop arrangement to hold up follower lever when not in use, and Fig. 5 a detail bottom view of the follower-block. Fig. 6 shows in vertical section the box, follower, and printing-block, with the butter inclosed.

A is the frame of the butter-press, of wood or other suitable material, consisting of the strong upright side posts, B, and the base C. Posts B are connected laterally by top piece, D, which is recessed at *a* for guiding the follower shaft or stem. At suitable height above base C, and supported by additional brackets or posts, E, are placed the horizontal pieces F, of suitable strength to carry the sliding box G. The front part of piece F is centrally recessed at *b* for the rectangular printing-block H, which is placed therein by its downward-extending handle *d*, with side projections *d'*. The face of block H is provided with countersunk letters or other design, which are to be imprinted on the butter. Block H is also slightly tapering upward to fit closely into sliding box G.

In large dairies the printing-block may be suitably pivoted and its handle connected by a slack string to the sliding box, so that when the box is raised the block is tilted by the tightening of the string and the butter-cake thrown off the block on a cloth or receptacle below. The position and weight of the handle carry the block back into its proper position for the descent of the box.

The sliding box G is formed with closed sides $a^2$ and with open top and bottom. It moves up and down in the upright guide-posts L, placed inside of main posts B on pieces F, and held by cross-piece D'. The sides of the box have projecting strips *e* for guiding the box along the posts L. An inclined mouth-piece, I, fits closely to the front part of box G, being attached thereto by hooks *f* and eyes *f'* to receive the fresh butter. The motion of the sliding box G is imparted by means of hand-lever *g*, pivoted at *g'* to main post B, which lever is connected by a vertical rod, *h*, with the horizontal transverse rod *h'*, that engages levers *i*, which are also pivoted on one side of main post B, and embrace with their bifurcated ends the lugs *i'* of box G, lifting or lowering the same, as required. An upright piece, *l*, which is pivoted to the side of mouth I of box G, acts on a notch, *l'*, of the follower-lever M, and raises the same, together with box G, at each upward motion of lever *g*. The mouth I may be detached from box G and the box from the guide-posts L, as one of them is set loosely into a groove, *m*, in one piece, F, and in cross-piece D'. The recess of post L into which piece D' is set is large enough to give full play to post L on lifting the same out of groove *m*. A recess, *m'*, of piece D', which inclines toward post L, allows the sideward motion of the lower part of post L, so that box G may be slipped out of the bifurcated ends of levers *i* and be taken off for cleaning or repairing. On replacing box G and post L the latter is firmly set into groove *m* by means of button *n*, which is pivoted on piece D' and turned over the ends of post L. The cross-piece D' carries in a central recess, *a'*, corresponding to that of the top piece, D, the follower shaft N, which is pivoted to lever M. An adjustable regulating-stop, *o*, may be arranged either on the upper end of the shaft N or sidewise at post L to arrest lever M, so that thereby a uniform quantity of butter is pressed in box G. The follower-block N′ fits accurately into box G, and has a vent-hole, *p*, through which the surplus butter passes out on the descent of the follower. This hole *p* may be provided with a slide arrangement for opening or closing the hole more or less. Lever M moves sidewise in staple *q* of one main post B, and along vertical guide-piece B′, which is detachably connected to the other main post B. A curved pivoted plate, *r*, with a stop, *r′*, is applied in such a manner to the side of main post B that the sliding end of lever M pushes the same aside in its up and downward movements, but is kept in the upward position when passing beyond the upper projecting end of plate *r*.

In the operation of the press the follower carries a quantity of fresh butter in excess of what is required to form the cake down upon the printing-block H, and the box G descending at the same time, the sides $a^2$, printing-block H, and follower N′ form the walls of a compression-chamber, as shown in Fig. 6, in which the butter is pressed into cakes. The follower-block, which constitutes one of the walls of this compression-chamber, is provided with an aperture, *p*, and as the compression-chamber contains more butter than is required for the cake the surplus butter will by the act of compression be forced out and escape through said aperture *p*, and thus the finished cakes of butter will all have exactly the same size and weight.

Having thus fully described our invention, what we claim as new, and desire to secure by Letters Patent, is—

1. The butter-press consisting of frame A, sliding box G, with mouth I, and levers *g i*, block H, guide-posts L, follower N N′, and lever M, substantially as and for the purpose described.

2. The combination of the printing-block H, having handle *d*, with guide-lugs *d′*, and the supporting-piece or platform F, provided with the slot *b*, as shown and described.

3. The sliding box G, having mouth I, guide-strips *e*, and lugs *i′*, the pivoted lever *g*, links *h*, rod *h′*, and levers *i*, combined as specified.

4. The combination of the follower-lever M, having notch *l′*, with the upright bar *l*, and box G, as and for the purposes specified.

5. The cross-piece D, having recesses *m′* and button *n* to lock post L, as described.

6. The pieces D D′, with guide-recesses *a a′* and follower-shaft N, having the regulating-stop *o*, combined as specified.

LEWIS COATES.
JOEL T. CRISWELL.

Witnesses:
THOMAS CRISWELL,
D. P. SHIELDS.